Sept. 23, 1958     T. VAN METER     2,853,025
POWER TRANSMISSION

Filed April 27, 1953     2 Sheets-Sheet 1

INVENTOR.
THEODORE VAN METER
BY
Ralph L. Tweedale
ATTORNEY

United States Patent Office 2,853,025
Patented Sept. 23, 1958

2,853,025

POWER TRANSMISSION

Theodore Van Meter, Oak Park, Mich., assignor to Vickers Incorporated, Detroit, Mich., a corporation of Michigan Application April 27, 1953, Serial No. 351,451

6 Claims. (Cl. 103—162)

This invention relates to power transmissions, and is particularly applicable to those of the type comprising two or more fluid pressure energy translating devices, one of which may function as a pump and another as a fluid motor.

More particularly the invention relates to an improved variable displacement pump unit for use in such power transmissions and especially to pumps of the type shown in Patent 1,931,969 to Hans Thoma.

In pumps of this general class the pumping action is created by pistons reciprocating within bores of a cylinder block, the angle of which, with respect to the drive shaft, may be changed by swinging a yoke which supports the cylinder block. As the angle of the cylinder block with respect to the drive shaft is decreased, the length of stroke of the pistons is decreased, resulting in a relatively diminishing volumetric output. If the yoke is swung to the completely neutral position the cylinder block will be in axial alignment with the drive shaft, and although the rotation of the block continues, there is no relative motion between the piston and the valve block and the output becomes zero.

In such units valve mechanism is provided to afford properly phased communication between the cylinders and the inlet and outlet ports of the unit. The most commonly used form of valve mechanism is that which utilizes a plate type valve having arcuate ports in the face thereof. The cylinder barrel of the unit is located so as to axially abut the valve plate and has ports therein communicating with the individual cylinders of the barrel. As the piston in each cylinder moves inward on the discharge stroke, the port of that cylinder moves into communication with the outlet port of the device. In like manner those cylinders in which the piston is on the intake stroke are connected to the inlet port of the device.

During operation of such a pumping unit the fluid in the outlet port and consequently in the cylinders connected thereto may be of the order of 5000 p. s. i., while the pressure in the inlet port, and hence the cylinders connected thereto, may be less than atmospheric pressure or in the case of a supercharged unit, say, 50 p. s. i. Thus, as a particular cylinder moves from communication with the outlet port to communication with the inlet port, and vice versa, there is a pressure fluctuation therein of approximately 5000 p. s. i. From the magnitude of the pressures involved, it may be understood that if the pressure transition is sudden, substantial shock forces will result with consequent noise and wear.

Hydraulic fluids are liquids and are normally regarded as incompressible. However, at pressures of the magnitude at which hydraulic units are currently operated, compressibility of the fluid medium becomes a very real consideration. For example, as a cylinder passes from communication with the outlet port, where pressure may be 5000 p. s. i., into communication with the low pressure at the inlet port, the fluid still in the cylinder will abruptly expand, forcing a small amount of fluid into the inlet port. The turbulence thus created is highly detrimental to the proper filling of the cylinder during the inlet stroke.

In fixed displacement units these problems have been met by providing a closed center zone in the valving wherein the cylinder is isolated from communication with both the inlet and the outlet ports, and during which time the piston in that cylinder is moved sufficiently to precompress the fluid therein prior to communication with the outlet port or decompress the fluid therein prior to communication with the inlet port. Such an arrangement permits a relatively gradual increase or lowering of pressure in the cylinder to the level of that in the port with which it is about to communicate, thus avoiding the heretofore mentioned difficulty resulting from an abrupt pressure change.

In variable displacement units the problem is greatly complicated since as the displacement is varied the amount of inward or outward movement of each piston while its cylinder is in the closed center position also varies. Thus, a closed center zone of adequate extent to permit sufficient piston movement to properly precompress or decompress at a particular displacement of the unit, may be either inadequate or too great at some other displacement.

A further difficulty is that as the operating pressure is varied, the piston movement required to precompress or decompress to or from that pressure also varies.

It is an object of this invention to provide an improved pumping mechanism of the articulated connecting rod type capable of long life and quiet operation at high pressures.

More particularly it is an object to provide such a pumping mechanism in which the fluid in each of the cylinders is properly precompressed and decompressed prior to communication with the outlet and inlet ports, respectively, throughout a wide range of displacement variation.

It is also an object to provide pumping mechanism which is easily adaptable for optimum operation at various pressures.

It is a further object to provide such a pumping mechanism having a low cost, rugged construction.

Further objects and advantages of the present invention will be apparent from the following description, reference being had to the accompanying drawings wherein a preferred form of the present invention is clearly shown.

Figure 1:
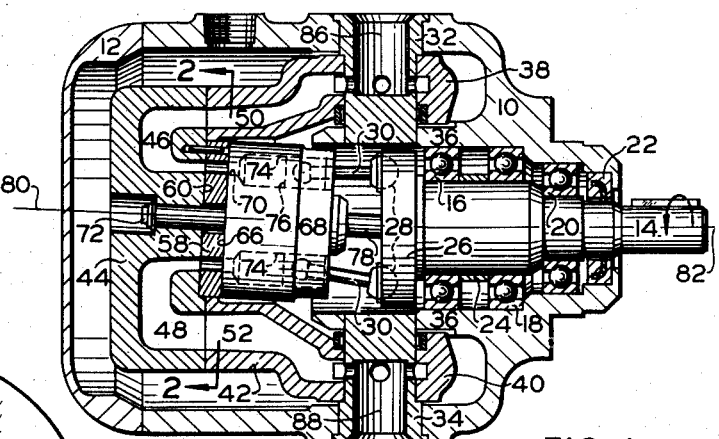
Figure 1 is a longitudinal section through pumping mechanism embodying the present invention.

Referring now to Figure 1 there is shown a variable displacement pump of the articulated connecting rod type described in the heretofore mentioned patent to Thoma. The pump includes a housing generally designated 10 which has an end cover 12 secured thereto. A drive shaft 14 is rotatably supported in the housing 10 by a plurality of bearings 16, 18, and 20. A conventional shaft seal 22 prevents leakage from the housing at the point of emergence of the shaft 14 therefrom. An axial thrust on the shaft 14 is transmitted to the housing through the inner race of bearing 16, spacer 24, and bearing 18.

Shaft 14 includes a flange 26 to which are socket-connected the ball ends 28 of a plurality of connecting rods 30 of which only two are shown.

A pair of hollow pintles 32 and 34 are positioned on opposite sides of the housing 10 and extend into the interior thereof where their inner ends are supported in a pair of tongues 36. Pintles 32 and 34 provide pivotal support for the arms 38 and 40 of a yoke member 42. It should be noted that the central axes of the pintles 32 and 34 lie in the plane containing the centers of the ball ends 28 of the connecting rods 30. Secured to the end of the yoke 42 is a valve block 44. Passage 46 connects a passage 50 in the arm 38 of yoke 42 to the outlet or high pressure port 54 of a valve plate 58. In like manner, passage 48 interconnects the yoke passage 52 to the inlet or low pressure port 56 in the valve plate 58. The valve plate 58 abuts the face 60 of the valve block 44 and is restrained against rotation by a pin 62. A delivery conduit is thus formed by passages 46 and 50 which conducts fluid to the hollow pintle 32 which forms an outlet port for the unit. Similarly, the passages 48 and 52 cooperate to form an inlet conduit which conducts fluid from the hollow pintle 34 which acts as an inlet port for the unit. The face 64 of the valve plate 58 cooperates with the face 66 of a cylinder barrel 68 to act as a rotary valve and also form an abutment to restrain axial movement of the cylinder barrel. During rotation of the cylinder barrel 68 the individual cylinder ports 70 are alternately brought in communication with the outlet port 54 and the inlet port 56. A cylinder bearing pin 72 extends from the valve block 44 into the center of the cylinder barrel 68 to restrain it against other than rotary motion against the valve plate 58.

The cylinder barrel 68 contains a plurality of cylinder bores 74 of which only two are shown. Each of the cylinder bores 74 contains a piston 76 which is axially slidable therein. Each of the pistons 76 is ball jointed to one end of one of the connecting rods 30, the other ends of which rods are ball jointed to the drive shaft 14 as heretofore noted. Rotational alignment between drive shaft 14 and cylinder barrel 68 is maintained by a universal link and pin assembly, indicated at 78, of the type described in the heretofore mentioned patent to Thoma.

Displacement of the unit is varied by pivotal movement of the yoke 42 about the axis of the pintles 32 and 34. Such movement varies the relative inclination of the axis 80 of the cylinder barrel 68 and the axis 82 of the drive shaft 14. In the unit illustrated, to increase the displacement the yoke is rotated about the axis of the pintles 32 and 34 in a counter-clockwise direction as viewed from the pintle 32.

It can be seen by reference to Figure 1 that the face 60 of the valve block 44 is inclined with respect to the axis of pintles 32 and 34. Further, it can be seen that the inclination of face 60 also produces an inclination of the valve plate 58 which results in the inclination of the axis 80 of cylinder barrel 68 away from perpendicularity with the axis of the pintles 32 and 34 and also out of coincidence with the axis 82 of the drive shaft 14. In the unit illustrated, the inclination of the plane of face 60 with respect to the axis of pintles 32 and 34 is of the order of three degrees. This arrangement provides the desired precompression and decompression of the fluid in the cylinder bores prior to their communication with the outlet and inlet kidney ports 56 and 58, respectively, as hereinafter described.

Figure 2:
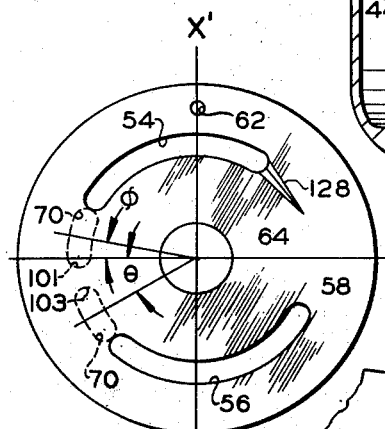
Figure 2 is an enlarged partial section taken on line 2—2 of Figure 1.
Figure 3:
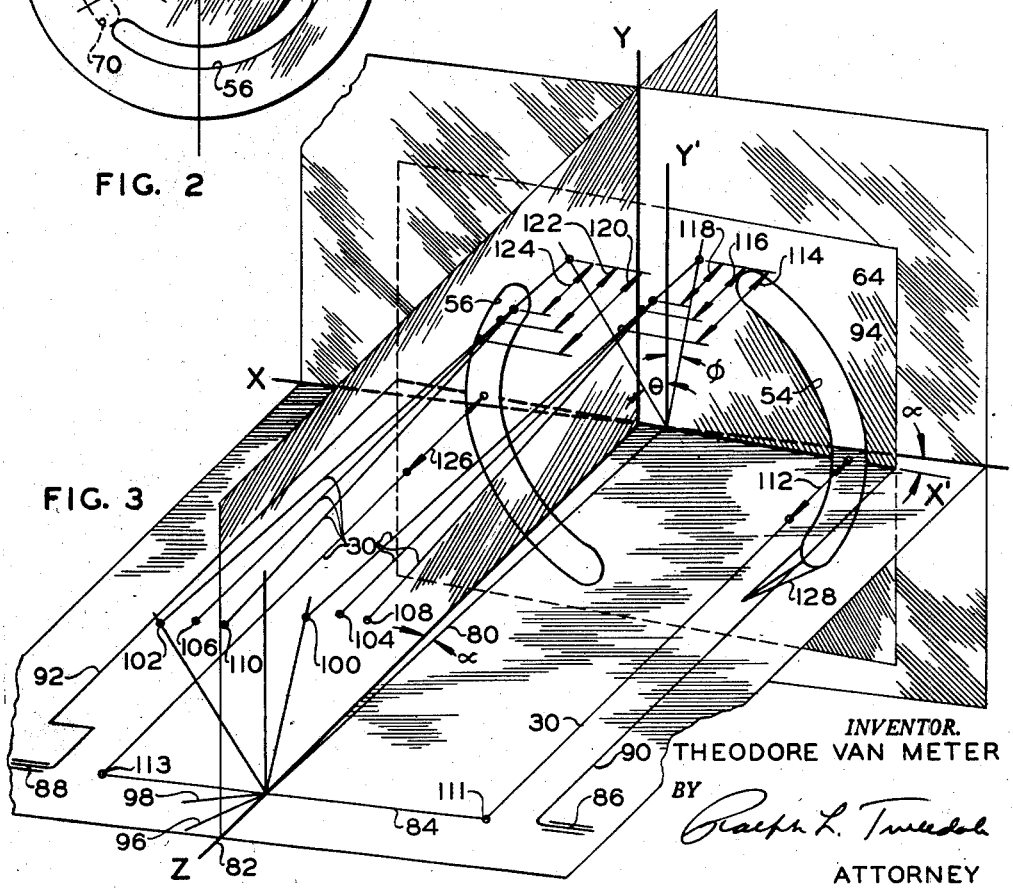
Figure 3 is a schematic representation of the spacial relation of certain of the pump parts utilizing a set of coordinate axes and the reference planes defined thereby.

Referring now to Figure 3 there is shown a system of coordinate axes and the reference planes defined thereby on which are schematically imposed certain parts of the pumping mechanism for the purpose of showing the spacial relation between them. The Z axis, as illustrated in Figure 3, is coincident with the axis 82 of the drive shaft 14, and extends perpendicularly to the intersection of the X and Y reference axes. The line 84 is parallel to the X—Y plane, lies in the X—Z plane, and represents the trace of the plane containing the centers of the ball ends 28 of the connecting rods 30. The axes of the pintles 32 and 34 are indicated at 86 and 88, respectively, and since, as heretofore noted, those axes lie in the plane of the center of the ball ends of the connecting rods, they lie on an extension of the line 84. The arms 38 and 40 of yoke 42 are respectively indicated by the lines 90 and 92. As heretofore noted, the valve plate 58 is supported by the arms of yoke 42 and the plane of the face 64 of the valve plate is represented by the plane 94 in Figure 3, and it is in this plane that the kidney ports 54 and 56 lie. As heretofore noted, and as can be plainly seen in Figures 1 and 3, the face 64 of the valve plate 58 is inclined with respect to the plane of the centers of the ball ends 28 of the connecting rods 30, the trace of which plane is represented by the line 84. The angle of inclination is of the order of three degrees and is indicated by the angle alpha in Figure 3. The axis 80 of cylinder barrel 68 is perpendicular to the plane of the face of the valve plate 58 and is represented by the line 80 in Figure 3. Its angle with respect to the Z axis is, of course, also equal to alpha. A pair of reference axes, X' and Y', have been imposed on the plane 94 in Figure 3, and occupy the same position with reference to the ports 54 and 56 as do the similarly designated axes in Figure 2. It should be noted that the axis 80 of the cylinder barrel 68, which lies in the X—Z plane, pierces the plane of the center of the balls 28 at a point coincident with that at which the axis 82 of the drive shaft 14 pierces that plane.

As heretofore noted, displacement of the unit is varied by pivotal movement of the valve plate 58, and hence cylinder barrel 68, about the axes 86 and 88 of the pintles 32 and 34, respectively. For purposes of clarity and simplicity of illustration, the method of displacement variation, as illustrated in Figure 3, has been varied somewhat from that of the actual unit although the basic concepts remain unchanged. Specifically, in the actual unit yoke 42 is shifted in housing 10 to vary the angle between the cylinder barrel axis 80 and the drive shaft axis 82. As illustrated in Figure 3, however, displacement variation is obtained by inclining the axis 82 of the drive shaft 14 to the positions indicated at 96 and 98. Since in Figure 3 the displacement is varied by tilting the axis 82 of drive shaft 14 about an axis coincident with the axes 86 and 88 of the pintles 32 and 34, and since it is about those axes the displacement adjustment is made in the actual unit, the kinematic considerations remain the same.

Points 100 and 102 represent two points in the path described by the ball end of one of the connecting rods 30 at minimum displacement of the unit, that is, when the drive shaft axis 82 coincides with the Z axis. More particularly, the point 100 represents the position of the ball end of the connecting rod of a cylinder whose port 70 has just moved out of communication with the outlet port 54 as indicated by the dotted outline 101 in Figure 2 and the angle phi in Figures 2 and 3. Similarly, the point 102 represents the position of the ball end of the connecting rod of a cylinder whose port 70 is just about to establish communication with the inlet port 56 as indicated by the dotted outline 103 in Figure 2 and the angle theta in Figures 2 and 3. Points 104 and 106 illustrate points corresponding to points 100 and 102 with the displacement of the unit having been increased by inclining the axis of the drive shaft to the position indicated at 96. Points 108 and 110 represent similar points at a still greater displacement, with the shaft axis positioned at 98.

The points 111 and 113 indicate the position of the ball ends of the connecting rods when they lie in the X—Z plane. Extending from the indicated position of the ball ends of the connecting rods in Figure 3 are lines 30 representing the connecting rods themselves. The distance of the piston end of the rod 30 from the plane 94 for each position illustrated is indicated by the arrows 112, 114, 116, 118, 120, 122, 124, and 126 which correspond respectively to the positions of the ball ends numbered 111, 100, 104, 108, 102, 106, 110, and 113. Since the pistons 76 are secured to the end of the rods 30, the arrows also are a measure of the distance of the piston 76 from the valve plate face 64. That is, the difference in length of any two of the arrows is the distance that a piston 76 moves relative to the valve plate while its cylinder moves angularly from one position to the other.

It can be seen that as a particular cylinder moves from the position indicated by 101 and the angle phi to that indicated by 103 and the angle theta, it is isolated from both the outlet port 54 and the inlet port 56. Ideally, as a cylinder moves from the position 101 to position 103 the piston therein should move outwardly sufficiently to just decompress the fluid therein from the pressure at the outlet port 54 to that existing in the inlet port 56. At any particular pressure the amount of this movement should theoretically be the same regardless of the displacement at which the unit is operating. In a fixed displacement pump operating at some particular pressure it is an easy matter to skew the port and select the proper closed center interval to accomplish this end. A variable displacement unit poses a more serious problem, however, since as the displacement is varied the distance a particular piston moves while crossing the closed center zone will also vary. Thus a closed center zone providing for adequate compression and decompression at a particular displacement may be inadequate or too great at some other displacement.

Reference to Figure 3 indicates the manner in which the present invention meets this problem. As heretofore noted, the plane of the face 64 of the valve plate 58 is supported by the yoke 42 in a manner such that it is inclined with respect to the axes 86 and 88 of the pintles 32 and 34, which axes lie in the plane of the centers of the ball 28, and about which the yoke 42 is pivotal to vary the displacement of the unit.

As the unit is operated, the ball ends 28 will follow a path in Figure 3 which is dependent on the inclination of the drive shaft axis 82 relative to the Z axis. Thus when the drive shaft axis 82 coincides with the Z axis and the shaft is rotated, the ball end 28 of one of the connecting rods 30 will successively pass through the points 111, 100, 102, and 113. This is the minimum displacement position of the unit and any piston movement as reflected by the differing lengths of the arrows 112, 114, 120, and 126, respectively, is due to the inclination of the plane face 64 of the valve plate 58 relative to the axis of the pintles 86 and 88. It can be seen that the distance of the pistons from the valve plate base progressively increases. Further, as the cylinder passes through the closed center zone by moving from the angular position indicated by the angle phi to the position indicated by the angle theta, the distance of its piston from the plane of the valve plate face will vary by the difference between the length of the arrows 114 and 120. The proportions of the unit components are so selected that this movement is of the right magnitude to properly reduce the pressure in that cylinder from, say 5000 p. s. i. at the outlet port 54 to, say 50 p. s. i. at the inlet port 56. As the axis 82 of the drive shaft 14 is inclined to the position indicated at 96 to increase the output of the unit, the 112 and 126 dimensions will remain unchanged. However, as the cylinder moves through the closed center position from phi to theta, the piston will now move a distance measured by the difference between the arrow 116 and the arrow 122. Similarly, when the drive shaft axis is inclined to the position indicated at 98, the distance moved by a piston as its cylinder moves from the position phi to the position theta is measured by the difference between the arrows 118 and 124. It should be noted that the distances 122 and 124 are larger than the distances 116 and 118, respectively, by the same amount that distance 120 is greater than the distance 114. Thus at the intermediate and maximum displacement positions, decompression is still proper to drop the pressure in the cylinder from that at the outlet port to that at the inlet port. It can be seen that the device provided will properly decompress the fluid in each of the cylinders as they pass from communication with the outlet ports into communication with the inlet ports. The same considerations bear upon the transition from the inlet port 56 to the outlet port 54 and thus are not discussed in detail. It might be pointed out, however, that in the transition from the inlet port to the outlet port, precautions have been taken to avoid unnecessarily large pressure build-up in the event the unit is operating at less than its rated outlet pressure. To this end there has been provided a metering groove 128 which provides for a gradually increasing communication between the cylinder in which the fluid is being precompressed in the outlet port 54.

Figure 4:
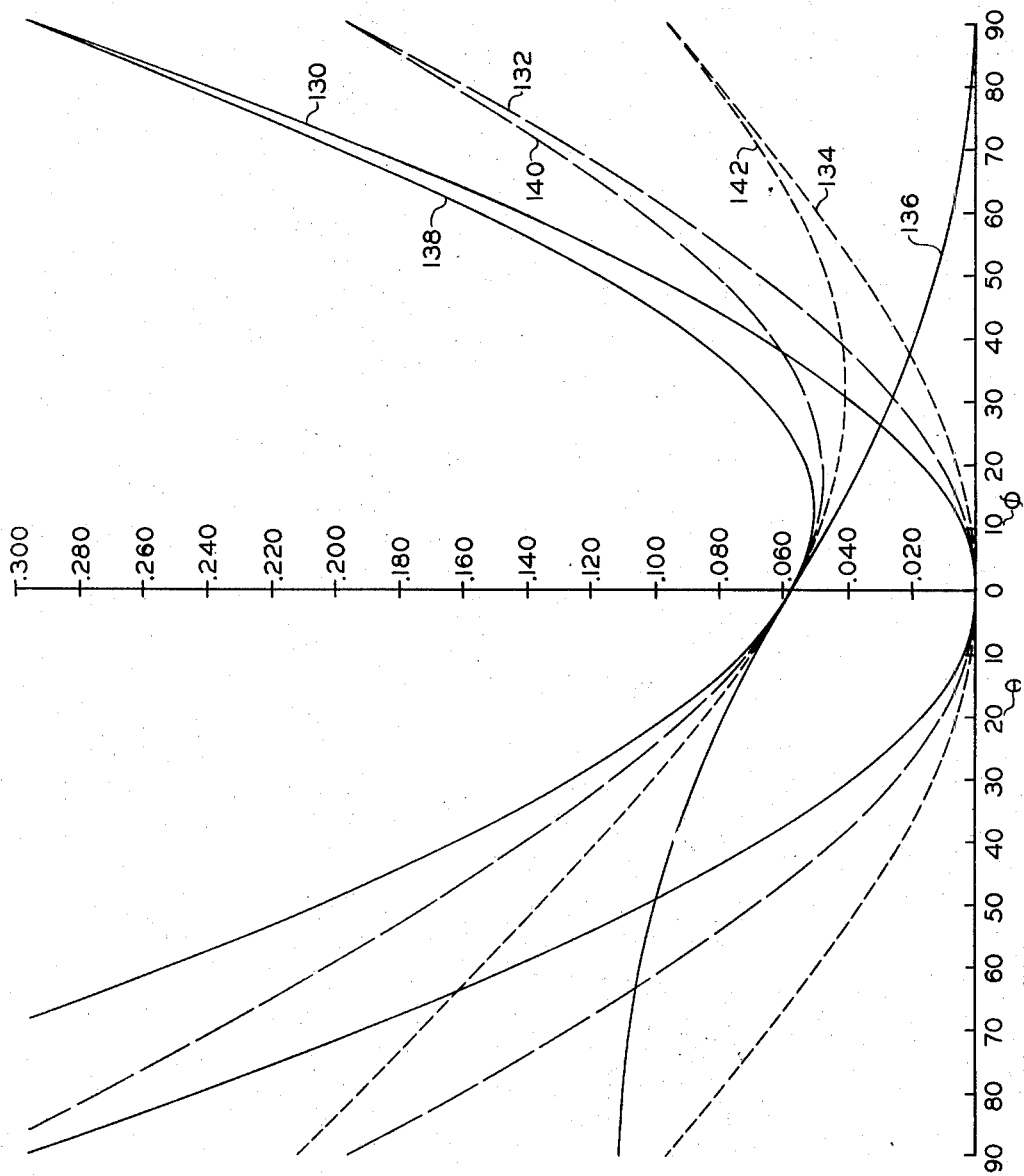
Figure 4 is a graph showing axial piston movement plotted against angular piston position for several different displacement settings.

Figure 4 illustrates a series of curves in which axial piston movement is plotted against angular cylinder position. The angular position of the cylinder under consideration is indicated in degrees along the abscissa while piston travel in inches is indicated along the ordinate. The curves plotted on the graph of Figure 4 are those calculated for an actual unit of the type described herein. Curves 130, 132, and 134 are plots of axial piston position versus angular piston position for a unit in which the face of the valve plate is not inclined with respect to the pintle axis but is parallel thereto, for yoke deflections of 15, 10, and 5 degrees, respectively. The curve for a zero degree swash plate inclination, of course, lies along the abscissa.

The curve 136 is for a unit such as the one described wherein the valve plate face is inclined, as heretofore noted, and in which the adjustable inclination is zero. That is, with reference to the coordinate axes of Figure 3, the plane of the centers of the ball ends 28 of the connecting rods 30 is perpendicular to the X—Z plane. The curves 138, 140, and 142 are those for yoke deflections of 15, 10, and 5 degrees, respectively, in the unit having the valve plate face inclined with respect to the axis of the pintle. Curves 138, 140, and 142 may be found by adding to the curves 130, 132, and 134, respectively, the value of curve 136 at any particular angular location. Taking the angle phi to be ten degrees and the angle theta to be twenty degrees, as indicated in Figure 4, the amount of piston movement as a piston moves across the closed centered portion of the valving in any particular displacement setting is easily ascertainable. It should be noted that the slopes of curves 138, 140, 142, and 136, as they pass through the closed center portion of the valving are substantially equal, and further that the piston movement through that zone, as indicated by the curve is substantially the same. As heretofore noted, ideally the movement should be the same for all displacements. While the present unit does not achieve the ideal it does approach it closely enough to practically eliminate the problems attendant upon large differential pressures existing between the cylinders and ports being brought into communication.

Comparison of the curves 138, 140, and 142, with the curves 130, 132, and 134 clearly indicates the advantage derived from inclining the valve plate face with respect to the pintle axes.

It should be further noted that an angle of inclination of the valve plate face with respect to the pintle axes which is correct for optimum operation at, say 5000 p. s. i. will not be proper for operation at, say 2000 p. s. i. since less piston movement to precompress or decompress the fluid in the cylinder is necessary. The unit described is adaptable for use at varying pressures by replacement of the valve block 44 with one having a different inclination of the face 60 relative to the axis or the axes of the pintles. By replacing only this one relatively low cost member the unit may be adapted for best operation at any required pressure. If desired, provision can be made for insertion of a shim between the surface 60 and the valve plate 58 to adjust the angularity of the valve plate face with respect to the pintle axes. Such an arrangement would still further facilitate conversion of the pump for operation at different pressures.

There has thus been provided pumping mechanism capable of long life and quiet operation at very high pressures. Further, the pumping mechanism provided is of a rugged, low cost construction which is easily adaptable for optimum operation over a wide range of pressures and displacements.

While the form of embodiment of the invention as herein disclosed constitutes a preferred form, it is to be understood that other forms might be adopted, all coming within the scope of the claims which follow.

What is claimed is as follows:

1. A fluid pressure energy translating device of the rotary, variable displacement type comprising: a housing; a drive shaft rotatably supported in the housing; a rotary cylinder barrel in a driving relation with the drive shaft and having a plurality of cylinder bores therein; pistons in said bores; articulated rods each having one end connected to one of the pistons and the other to the drive shaft; means forming a valve member having inlet and outlet ports therein to effect properly phased communication with said cylinders; abutment means providing planar points of contact with said cylinder barrel to provide axial support therefore; and means for pivotally supporting the abutment means in the housing, said means including pintle means having an axis perpendicular to the axis of said drive shaft and inclined with respect to the plane of said planar points of contact whereby to properly precompress and decompress the fluid in the cylinders prior to communication with the outlet and inlet ports.

2. A fluid pressure energy translating device of the rotary, variable displacement type comprising: a housing; a drive shaft rotatably supported in the housing; a rotary cylinder barrel in a driving relation with the drive shaft and having a plurality of cylinder bores therein; pistons in said bores; articulated rods each having one end connected to one of the pistons, the other end of each of those rods having coplanar ball and socket connections with the drive shaft; means forming a valve member having inlet and outlet ports therein to effect properly phased communication with said cylinder; abutment means providing planar points of contact with said cylinder barrel to provide axial support therefore; and means for pivotally supporting the valve member in the housing, said means including pintle means having an axis which lies in the plane of the centers of said ball and socket joints and is inclined with respect to the plane of said planar points of contact whereby to properly precompress and decompress the fluid in the cylinders prior to communication with the outlet and inlet ports.

3. A fluid pressure energy translating device of the rotary, variable displacement type comprising: a housing; a drive shaft rotatably supported in the housing; a rotary cylinder barrel in a driving relation with the drive shaft and having a plurality of cylinder bores therein; pistons in said bores; articulated rods each having one end connected to one of the pistons, the other end of each of those rods having coplanar ball and socket connections with the drive shaft; means forming a valve member having inlet and outlet ports therein to effect properly phased communication with said cylinders; abutment means providing planar points of contact with said cylinder barrel to provide axial support therefore; and means for pivotally supporting the abutment means in the housing, said means including pintle means having an axis which lies parallel to the plane of the centers of said ball and socket joints and inclined with respect to the plane of said planar points of contact whereby to properly precompress and decompress the fluid in the cylinders prior to communication with the outlet and inlet ports.

4. A fluid pressure energy translating device of the rotary, variable displacement type comprising: a housing; a drive shaft rotatably supported in the housing; a rotary cylinder barrel in a driving relation with the drive shaft and having a plurality of cylinder bores therein; pistons in said bores; articulated rods each having one end connected to one of the pistons, the other end of each of those rods having coplanar ball and socket connections with the drive shaft; means forming a valve member having inlet and outlet ports therein to effect properly phased communication with said cylinders; abutment means providing planar points of contact with said cylinder barrel to provide axial support therefore, the axis of rotation of said cylinder barrel and the axis of rotation of said drive shaft intersecting in the plane of the centers of said ball and socket joints; and means for pivotally supporting the abutment means in the housing, said means including pintle means having an axis perpendicular to the axis of said drive shaft and inclined with respect to the plane of said planar points of contact whereby to properly precompress and decompress the fluid in the cylinders prior to communication with the outlet and inlet ports.

5. A fluid pressure energy translating device of the rotary, variable displacement type comprising: a housing; a drive shaft rotatably supported in the housing; a rotary cylinder barrel in a driving relation with the drive shaft and having a plurality of cylinder bores therein; pistons in said bores; articulated rods each having one end connected to one of the pistons, the other end of each of those rods having coplanar ball and socket connections with the drive shaft; means forming a valve member having inlet and outlet ports therein to effect properly phased communication with said cylinders; abutment means providing planar points of contact with said cylinder barrel to provide axial support therefore, the axis of rotation of said cylinder barrel and the axis of rotation of said drive shaft intersecting in the plane of the centers of said ball and socket joints; and means for pivotally supporting the abutment means in the housing, said means including pintle means having an axis which lies in the plane of the centers of said ball and socket joints and inclined with respect to the plane of said planar points of contact whereby to properly precompress and decompress the fluid in the cylinders prior to communication with the outlet and inlet ports.

6. A fluid pressure energy translating device of the rotary, variable displacement type comprising: a housing; a drive shaft rotatably supported in the housing; a rotary cylinder barrel in a driving relation with the drive shaft and having a plurality of cylinder bores therein; pistons in said bores; articulated rods each having one end connected to one of the pistons, the other end of each of those rods having coplanar ball and socket connections with the drive shaft; means forming a valve member having inlet and outlet ports therein to effect properly phased communication with said cylinders; abutment means providing planar points of contact with said cylinder barrel to provide axial support therefore, the axis of rotation of said cylinder barrel and the axis of rotation of said drive shaft intersecting in the plane of the centers of said ball and socket joints; and means for pivotally supporting the abutment means in the housing, said means including pintle means having an axis which lies in the plane of the centers of said ball and socket joints, intersecting the axes of rotation of both said drive shaft and cylinder barrel, and is inclined with respect to the plane of said planar points of contact whereby to properly precompress and decompress the fluid in the cylinders prior to communication with the outlet and inlet ports.

References Cited in the file of this patent

UNITED STATES PATENTS

| | | |
|---|---|---|
| 2,313,407 | Vickers | Mar. 9, 1943 |
| 2,337,821 | Huber | Dec. 28, 1943 |
| 2,619,041 | Born | Nov. 25, 1952 |
| 2,699,123 | Bonnette | Jan. 11, 1955 |